United States Patent
Batraski et al.

(10) Patent No.: US 9,892,426 B2
(45) Date of Patent: *Feb. 13, 2018

(54) SEARCH ASSISTANT SYSTEM AND METHOD

(71) Applicant: EXCALIBUR IP, LLC, New York, NY (US)

(72) Inventors: Ethan Batraski, Foster City, CA (US); Vivian Lin Dufour, London (GB); Aarti Parmar, London (GB); Shenhong Zhu, Santa Clara, CA (US); Olivia Franklin, Santa Clara, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,188

(22) Filed: Nov. 14, 2016

(65) Prior Publication Data

US 2017/0061485 A1 Mar. 2, 2017

Related U.S. Application Data

(63) Continuation of application No. 13/053,847, filed on Mar. 22, 2011, now Pat. No. 9,495,461.

(51) Int. Cl.
*G06F 7/00* (2006.01)
*G06F 17/30* (2006.01)
(Continued)

(52) U.S. Cl.
CPC ..... *G06Q 30/0256* (2013.01); *G06F 17/3097* (2013.01); *G06F 17/30705* (2013.01);
(Continued)

(58) Field of Classification Search
None
See application file for complete search history.

(56) References Cited

U.S. PATENT DOCUMENTS 7,890,499 B1 2/2011 Boswell
8,639,715 B1 * 1/2014 Brinck .............. G06F 17/30867
707/767

(Continued)

FOREIGN PATENT DOCUMENTS

CN 1448037 10/2003
TW 200912255 3/2009

OTHER PUBLICATIONS

Google: About Goggle Instant http://www.google.com/instant/; viewed Feb. 24, 2011.

(Continued)

*Primary Examiner* — Tuan A Pham
(74) *Attorney, Agent, or Firm* — James J. DeCarlo; Greenberg Traurig, LLP

(57) ABSTRACT

Disclosed is a system and method for presenting content in response to receiving a portion of a search query. A computing device receives, over a network from a user computer, a portion of a search query submitted by a user in a search query entry area. The computing device receives, from a search suggestion module, one or more search suggestions related to the portion of the query. The computing device transmits, to the user computer, the one or more search suggestions for display in a search suggestion region, the search suggestion region displayed differently than a search results area. The computing device transmits a search suggestion of the one or more search suggestions to a rich content module. The rich content module generates rich content related to the transmitted search suggestion. The computing device transmits, to the user computer, the rich content for display in the search suggestion region.

18 Claims, 17 Drawing Sheets

(51) Int. Cl.
  *G06Q 30/02* (2012.01)
  *G06Q 20/10* (2012.01)
  *G06Q 50/00* (2012.01)
(52) U.S. Cl.
  CPC ..... *G06F 17/30867* (2013.01); *G06Q 20/102* (2013.01); *G06Q 30/0273* (2013.01); *G06Q 30/0277* (2013.01); *G06Q 50/01* (2013.01)

(56) References Cited

U.S. PATENT DOCUMENTS

| | | | |
|---|---|---|---|
| 9,378,283 B2* | 6/2016 | Batraski | G06F 17/30864 |
| 2005/0283468 A1 | 12/2005 | Kamvar et al. | |
| 2007/0060136 A1 | 3/2007 | Rmer et al. | |
| 2007/0130276 A1 | 6/2007 | Zhang et al. | |
| 2007/0288473 A1 | 12/2007 | Mukherjee | |
| 2008/0109401 A1 | 5/2008 | Sareen et al. | |
| 2008/0209309 A1 | 8/2008 | Zhang et al. | |
| 2008/0292265 A1* | 11/2008 | Worthen | G11B 27/034 386/282 |
| 2009/0019002 A1 | 1/2009 | Boulis | |
| 2009/0083232 A1 | 3/2009 | Ives et al. | |
| 2009/0094221 A1 | 4/2009 | Cameron et al. | |
| 2009/0112848 A1 | 4/2009 | Kunjithapatham et al. | |
| 2009/0187515 A1* | 7/2009 | Andrew | G06F 17/3064 706/12 |
| 2009/0313237 A1 | 12/2009 | Agrawal | |
| 2009/0319517 A1* | 12/2009 | Guha | G06F 17/30864 |
| 2009/0327236 A1* | 12/2009 | Denney | G06F 17/3064 |
| 2010/0057675 A1* | 3/2010 | White | G06Q 30/02 707/E17.108 |
| 2010/0057698 A1* | 3/2010 | Prasad Kantamneni | G06F 17/3097 707/E17.015 |
| 2010/0082604 A1* | 4/2010 | Gutt | G06F 17/30648 707/721 |
| 2010/0138491 A1* | 6/2010 | Churchill | G06Q 50/00 709/204 |
| 2010/0211588 A1 | 8/2010 | Jiang et al. | |
| 2010/0312773 A1 | 9/2010 | Boerries et al. | |
| 2010/0299343 A1* | 11/2010 | Ahari | G06F 17/30702 707/759 |
| 2010/0306229 A1 | 12/2010 | Timm | |
| 2011/0055189 A1 | 3/2011 | Effrat et al. | |
| 2011/0072033 A1 | 3/2011 | White et al. | |
| 2012/0246165 A1* | 9/2012 | Batraski | G06F 17/30867 707/740 |

OTHER PUBLICATIONS

International Search Report and Written Opinion issued in International Application No. PCT/US2012/026300 dated Dec. 14, 2012.
Supplementary European Search Report (EP 12 76 0368) dated Mar. 25, 2015; 2 pages.

* cited by examiner

YAHOO!

Web | Images | Video | Local | Shopping | News | More ▽ kobe kobe bryant
kobe bryant divorce
kobe steakhouse
kobe beef
kobe shoes
kobelco
kobe best dunks
kobe japan
kobe bryant paternity suit
kobe doin' work Kobe Bryant - #24 View Profile
Shooting Guard - Los Angeles Lakers
sports.yahoo.com Kobe Bryant News
Kobe Bryant Game Log
Kobe Bryant Scores & Schedule
Kobe Bryant Photos

| 2010-11 Season Averages | | | | Y! Fantasy Rank | |
|---|---|---|---|---|---|
| Points | Assists | Steals | 3PT Made | Season | Last Month |
| 25.1 | 4.9 | 1.2 | 1.3 | 21 | 24 |

Search

Options ▽

Kobe Bryant - Wikipedia, the free encyclopedia
Early years | NBA career | Player profile | NBA career statistics NBA.com : Kobe Bryant Info Page 912
910
905
915

SEARCH ASSISTANT SYSTEM AND METHOD

This application is a continuation of and claims priority to U.S. patent application Ser. No. 13/053,847, filed on Mar. 22, 2011, entitled "Search Assistant System and Method", which is hereby incorporated by reference in its entirety.

FIELD

The present disclosure relates to searching on the web, and more specifically to content presented in response to receiving a portion of a search query.

BACKGROUND

With a vast amount of information existing on the web today, it is difficult to filter or quickly find the correct or most relevant content that a user is looking for. Users are often goal driven and typically require quick, easy solutions. For example, a search for the latest product to purchase may involve visiting multiple pages and reformulations of the search query before a satisfactory result is obtained. Further, search engines typically confine their results to the traditional ten links on the search results web page. It is often difficult for a user to locate his or her answer to a query without conducting multiple searches via multiple search engine queries.

SUMMARY

This disclosure provides rich content in a search suggestion region as a user types a search query into a search query entry area. This helps alleviate the burdens of search results as described above.

In one aspect, a computing device receives, over a network from a user computer, alphanumeric characters forming a portion of a search query submitted by a user in a search query entry area. The computing device receives, from a search suggestion module, one or more search suggestions related to the portion of the search query. The computing device transmits, to the user computer, the one or more search suggestions for display by the user computer in a search suggestion region before the search query is initiated via user input, the search suggestion region displayed differently than a search results area. The computing device transmits a search suggestion of the one or more search suggestions to a rich content module. The rich content module generates rich content related to the transmitted search suggestion. The computing device transmits, to the user computer, the rich content for display in the search suggestion region before the search query is initiated via user input.

In one embodiment, the transmitting of the search suggestion to a rich content module further includes classifying, by the rich content module, the search suggestion into a category. In one embodiment, the classifying is based on a classification technique, such as fixed priority order, query classification confidence level, using search session context of the user, and using a search history profile of the user.

In one embodiment, the receiving of rich content includes scraping the network for the rich content. This may be performed while the computing device is not in communication with the user computer. The rich content may also be received from a database. In one embodiment, search engine query logs are mined by classifying queries in the logs into one or more categories. In one embodiment, a relationship is generated, such as a query to query relationship and/or a query to search result relationship. In one embodiment, social network feeds are used.

In one embodiment, the transmitting of the rich content further includes transmitting an advertisement as part of the rich content. In one embodiment, a sponsored search suggestion is transmitted as part of the one or more search suggestions. In one embodiment, the one or more search suggestions are updated as additional alphanumeric characters are input into the search query entry area by the user. In one embodiment, the rich content is updated as additional alphanumeric characters are input into the search query entry area by the user.

In another aspect, a computing device comprises a network interface that receives, over a network from a user computer, alphanumeric characters forming a portion of a search query submitted by a user in a search query entry area. A search suggestion module of the computing device generates one or more search suggestions related to the portion of the search query, where the network interface transmits to the user computer the one or more search suggestions for display by the user computer in a search suggestion region before the search query is initiated via user input. In one embodiment, the search suggestion region is displayed differently than a search results area. A rich content module of the computing device receives a search suggestion of the one or more search suggestions and generates rich content related to the transmitted search suggestion. In one embodiment, the network interface transmits to the user computer the rich content for display by the user computer in the search suggestion region before the search query is initiated via user input.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

Figure 9B:
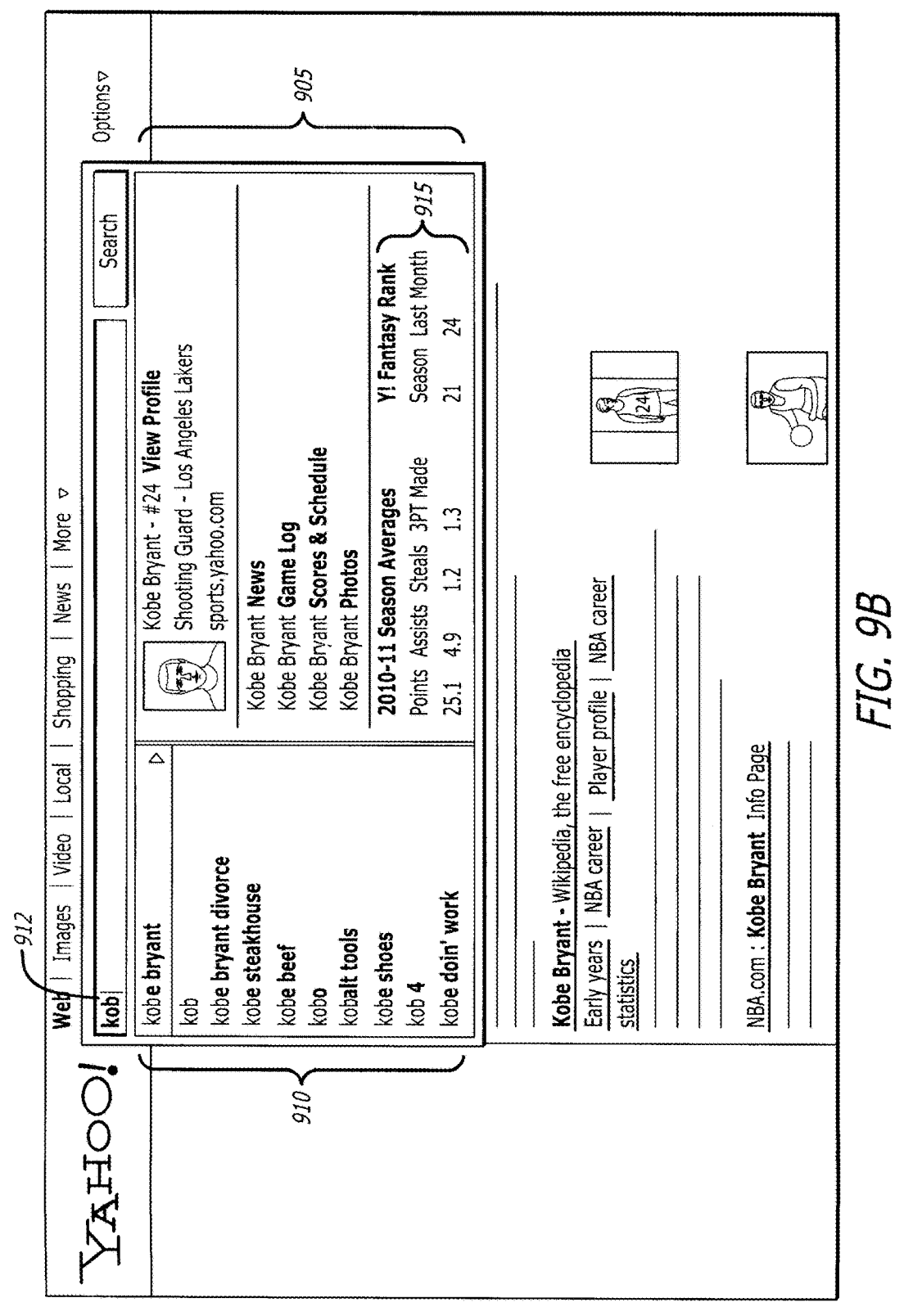
Figure 9D:
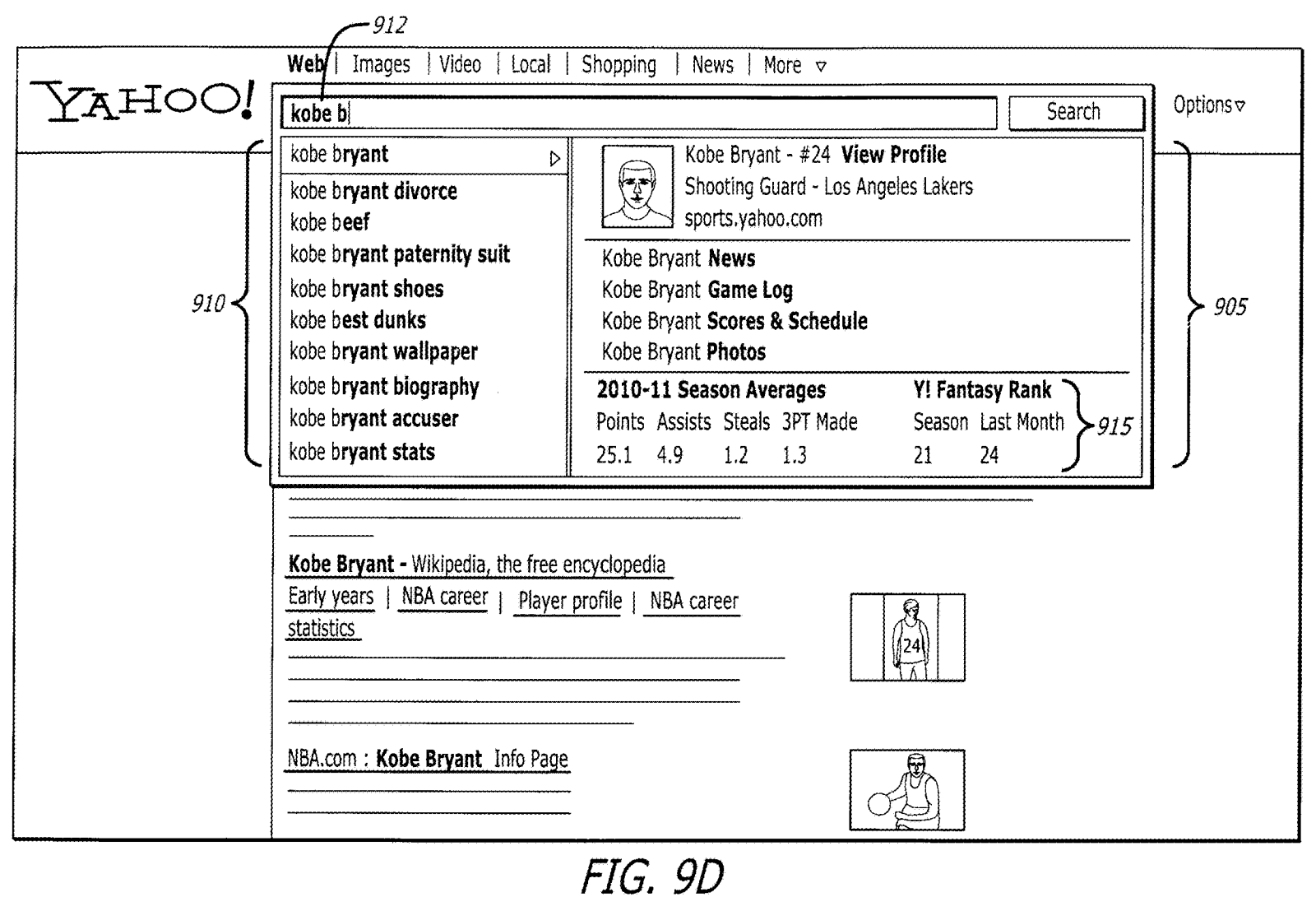
Figure 9E:
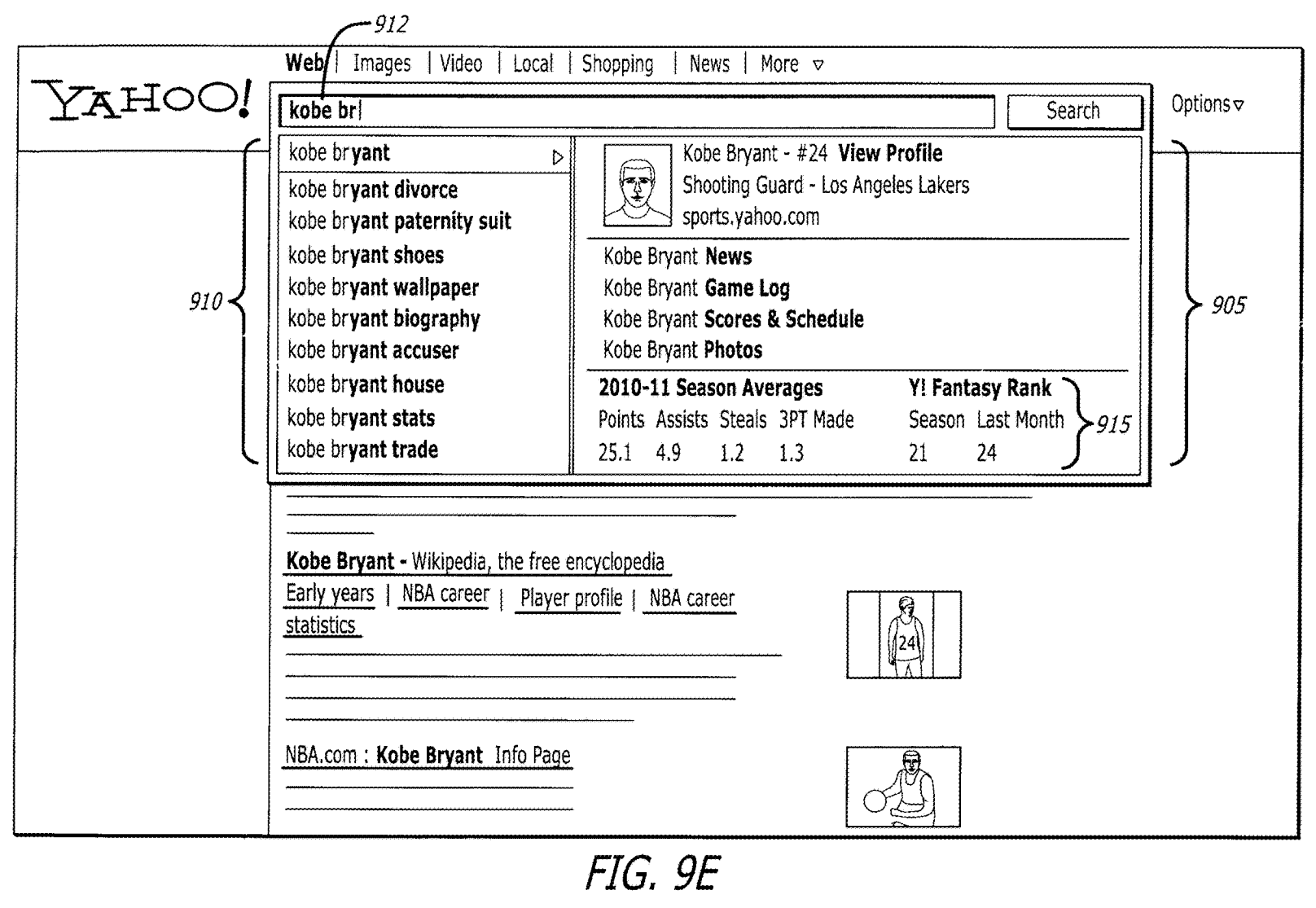
Figure 9F:
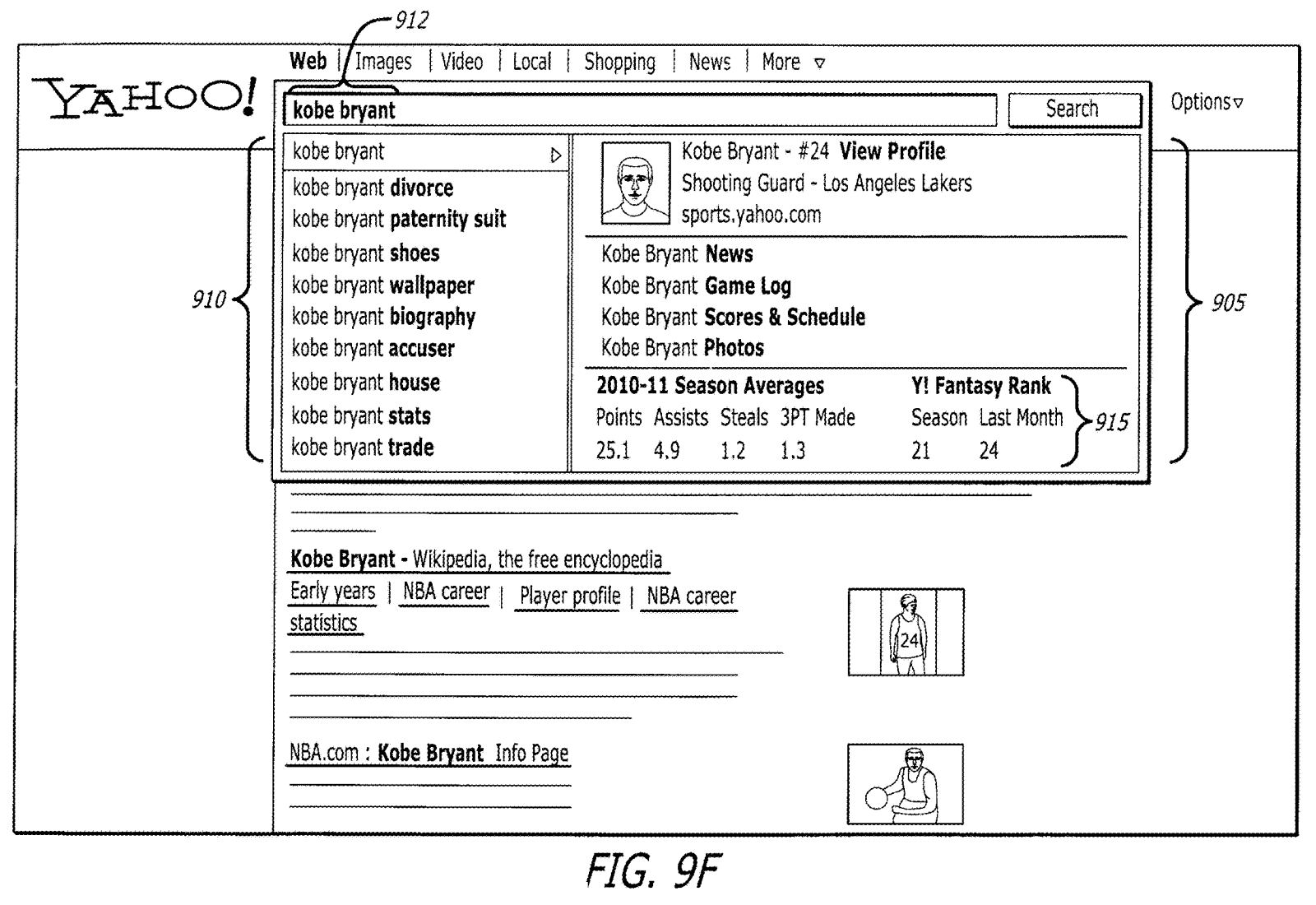

FIGS. 9A-9F are screen shots of a web page having rich content and search suggestions updated as a search query changes in accordance with an embodiment of the present disclosure;

DESCRIPTION OF EMBODIMENTS

Figure 1A:
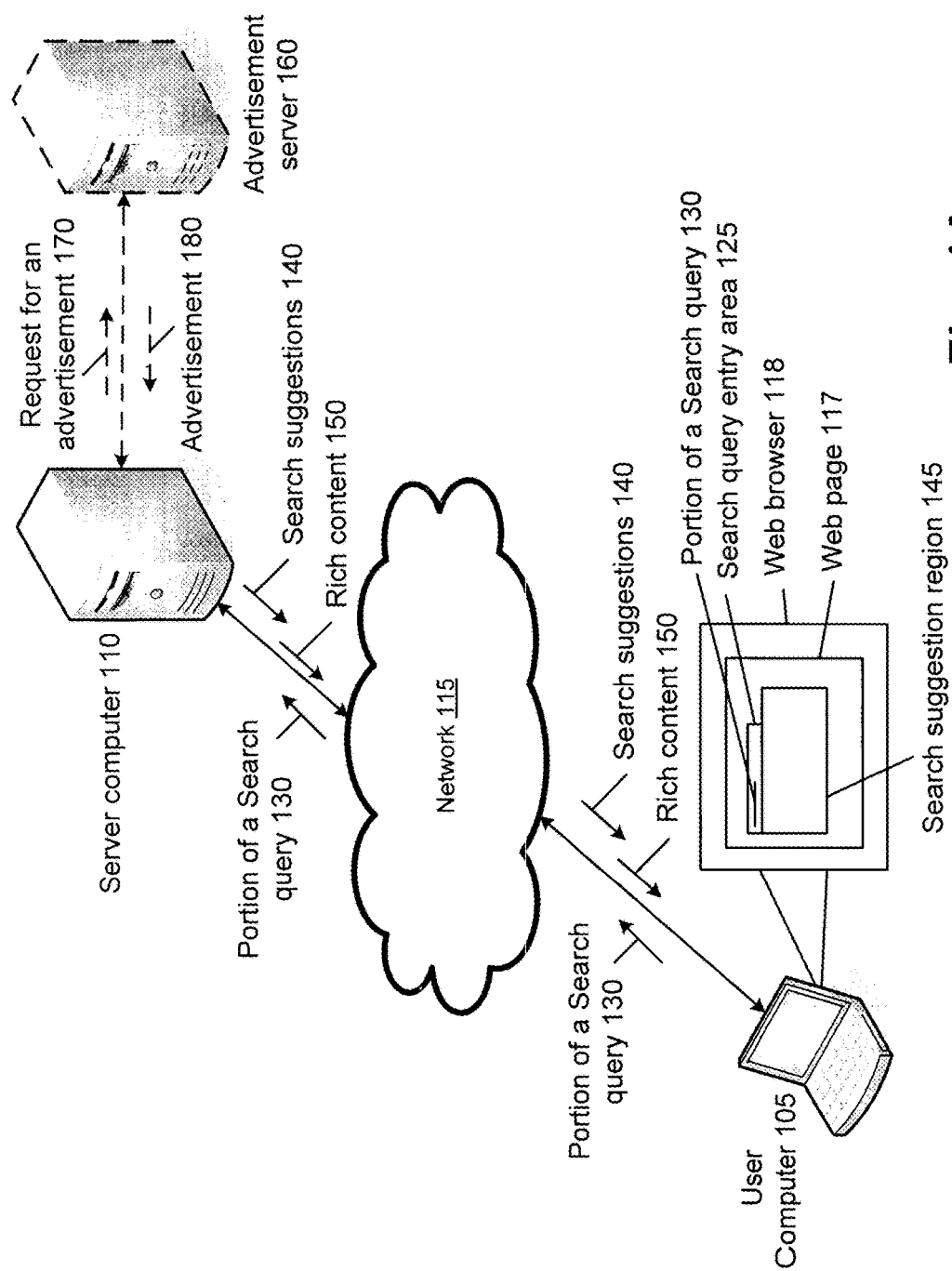
FIG. 1A is a block diagram of a user computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

FIG. 1A is a block diagram of an embodiment of a user computer 105 communicating with a server computer 110 over a network 115 such as the Internet. In one embodiment, a user uses the user computer 105 to display a web page 117 via a web browser 118. The web page 117 (e.g., Yahoo!®, Bing®, or Google®) includes a search query entry area 125 where a user can enter a portion of a search query (e.g., one or more alphanumeric characters) or a complete search query (e.g., one or more words).

In one embodiment, the user enters a portion of a search query (e.g., one or more alphanumeric characters) into the search query entry area 125. As (or, in another embodiment, after) the user types the portion of the search query into the search query entry area 125, the user computer 105 (browser 118) transmits the portion of the search query 130 to the server computer 110. In response to receiving the portion of the search query 130, the server computer 110 generates and transmits one or more search suggestions 140 to the user computer 105 for display in a search suggestion region 145. The search suggestions 140 are one or more words that relate to the portion of the search query 130. For example, if a user types "kob" into the search query entry area 125, the search suggestions displayed by the user computer 105 may be "Kobe Bryant" and "kobe beef". The server computer 110 also transmits rich content 150 to the user computer 105 for display in the search suggestion region 145 of the web page 117.

Figure 1B:
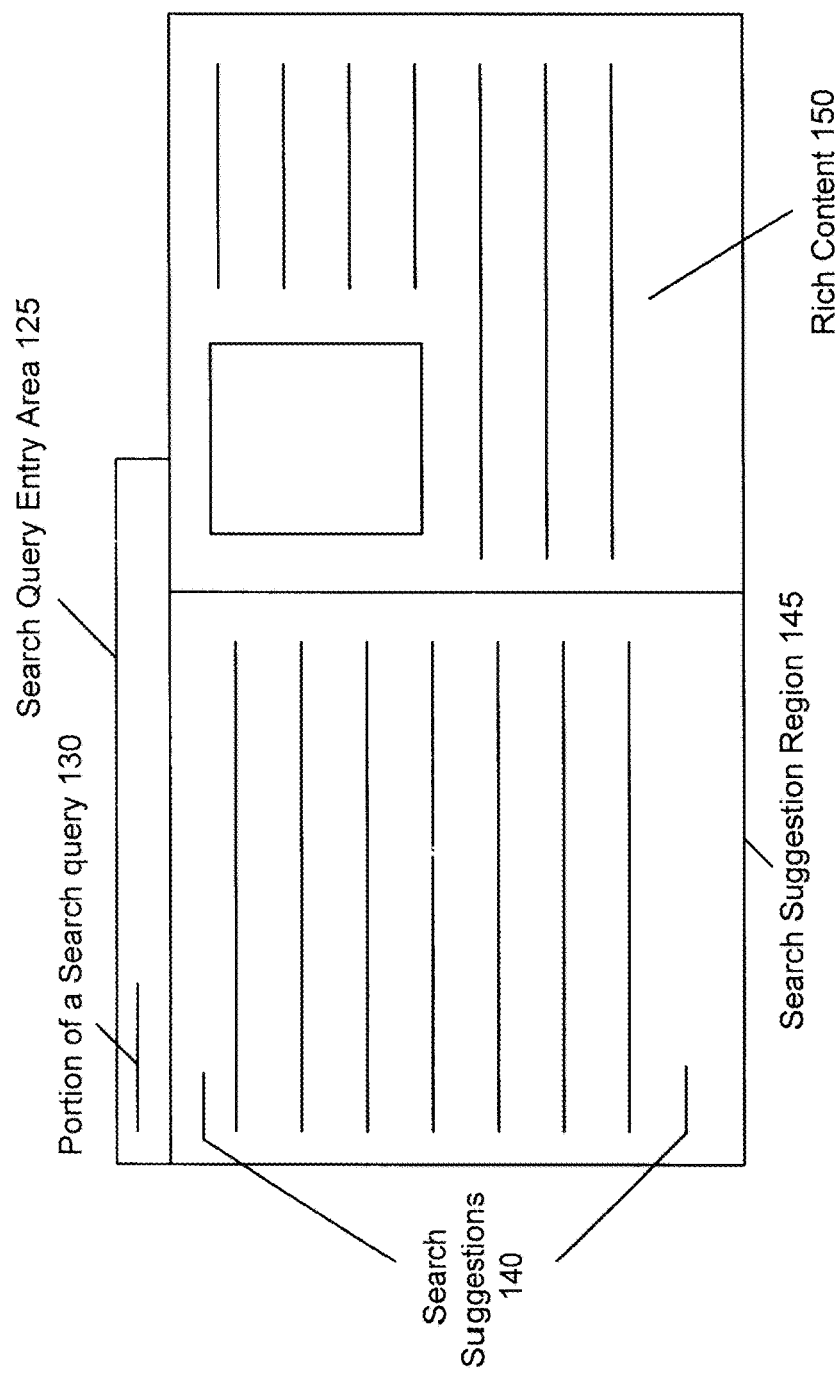
FIG. 1B is a block diagram of a search suggestion region displayed by the user computer of FIG. 1A.

Also referring to FIG. 1B, the rich content 150 is structured information related to a search suggestion 140. Using the example above, in one embodiment if the mouse hovers over the search suggestion 140 "Kobe Bryant", then the rich content 150 may include a picture of Kobe Bryant, his position, his team, his averages for the season, a link to more information about Kobe Bryant, etc. Thus, the user does not have to click the "Search" button on the web page 117 to obtain this information—it automatically appears next to the corresponding search suggestion. In one embodiment, the portion of the search query 130 is a portion of a complete word or phrase (e.g., a few letters of a word). Although described as a portion of a search query 130, the user can instead enter a complete search query (e.g., a complete word or phrase) with the same results.

In one embodiment, the rich content 150 is information that is presented next to (or above or below) the search suggestions 140 in the search suggestion region 145. The rich content 150 can include text, one or more graphics, one or more web links, one or more icons, one or more pictures, one or more videos (e.g., a video is played when the user clicks on a file or link associated with the video), one or more audio tracks (e.g., a song is played when the user clicks on a file or link associated with the song), one or more answers to a question, etc.

The search suggestion region 145 is an area of a web page that is different than the area containing search results of a search. In one embodiment, the search suggestion region 145 overlaps, is positioned above, is positioned below, or is positioned next to the area containing search results. The area containing search results is typically an area containing search results for a search query or a portion of a search query that contains links to web sites and a brief textual description associated with each web site. For example, Google Instant® is a service that returns, in a search results area, search results for a complete search query or a portion of a search query. These search results are located below the search query entry area and are links associated with web pages potentially related to the search query or portion of the search query. As illustrated in more detail below, the search suggestion region 145 displaying the rich content 150 (and search suggestions 140) is a separate area different than the area containing search results. In one embodiment, the size, position, and/or shape of the search suggestion region 145 can be changed by the user.

Further, the search suggestion region 145 can be opened or closed by the user or automatically. Additionally, any number of search suggestions and/or rich content sections can be displayed in the search suggestion region 145. For example, although described herein as one rich content section being displayed for a single search suggestion, in another embodiment multiple rich content sections are shown in the search suggestion region 145 corresponding to multiple search suggestions (e.g., display rich content for each of the first four search suggestions, where each rich content section is divided by a line in the search suggestion region 145). In one embodiment, the rich content section is capable of displaying tabbed pages. For example, if a query suggestion terms of "chicago" is selected, the right panel could have embedded tabbed pages in which each tab represents different intents such as "Musical", "Travel", etc.

In one embodiment, the server computer 110 is in communication with an advertisement server 160 (shown in dashed lines). The advertisement server 160 may be a module or component within the server computer 110 or an external module or component. In one embodiment, the server computer 110 transmits a request for an advertisement 170 to the advertisement server 160. In one embodiment, the request 170 is for an advertisement related to the rich content 150 and/or the search suggestion 140. The advertisement server 160 transmits an advertisement 180 to the server computer 110, and the server computer 110 transmits the advertisement 180 as part of the rich content 150 displayed on the user computer 105. In another embodiment, one or more of the search suggestions 140 transmitted to the user computer 105 are search suggestions 140 sponsored by a third party. For example, a third party may pay the owner of the server computer 110 to display their search suggestion 140 at a particular position (e.g., first) in the list of search suggestions 140.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

Figure 2:
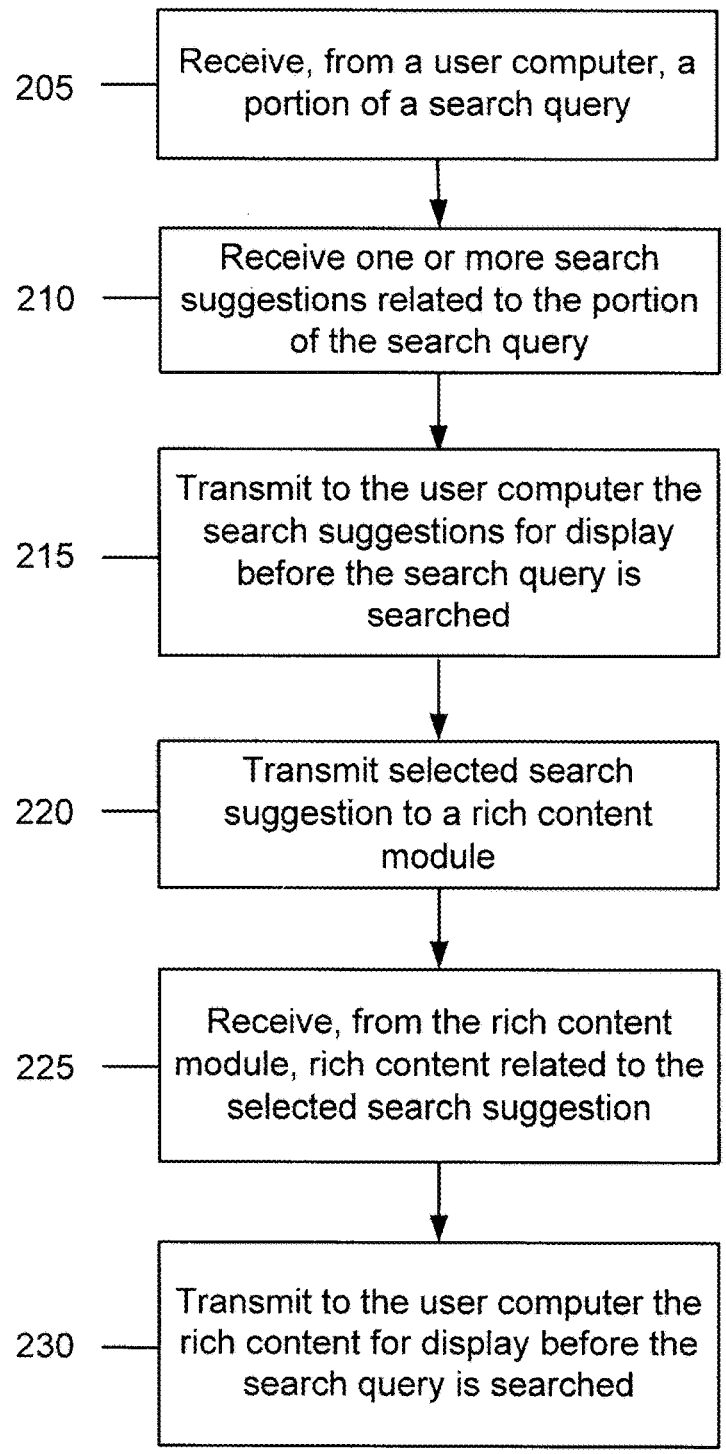
FIG. 2 is a flowchart illustrating steps performed by the server computer of FIG. 1A in accordance with an embodiment of the present disclosure.
Figure 3:
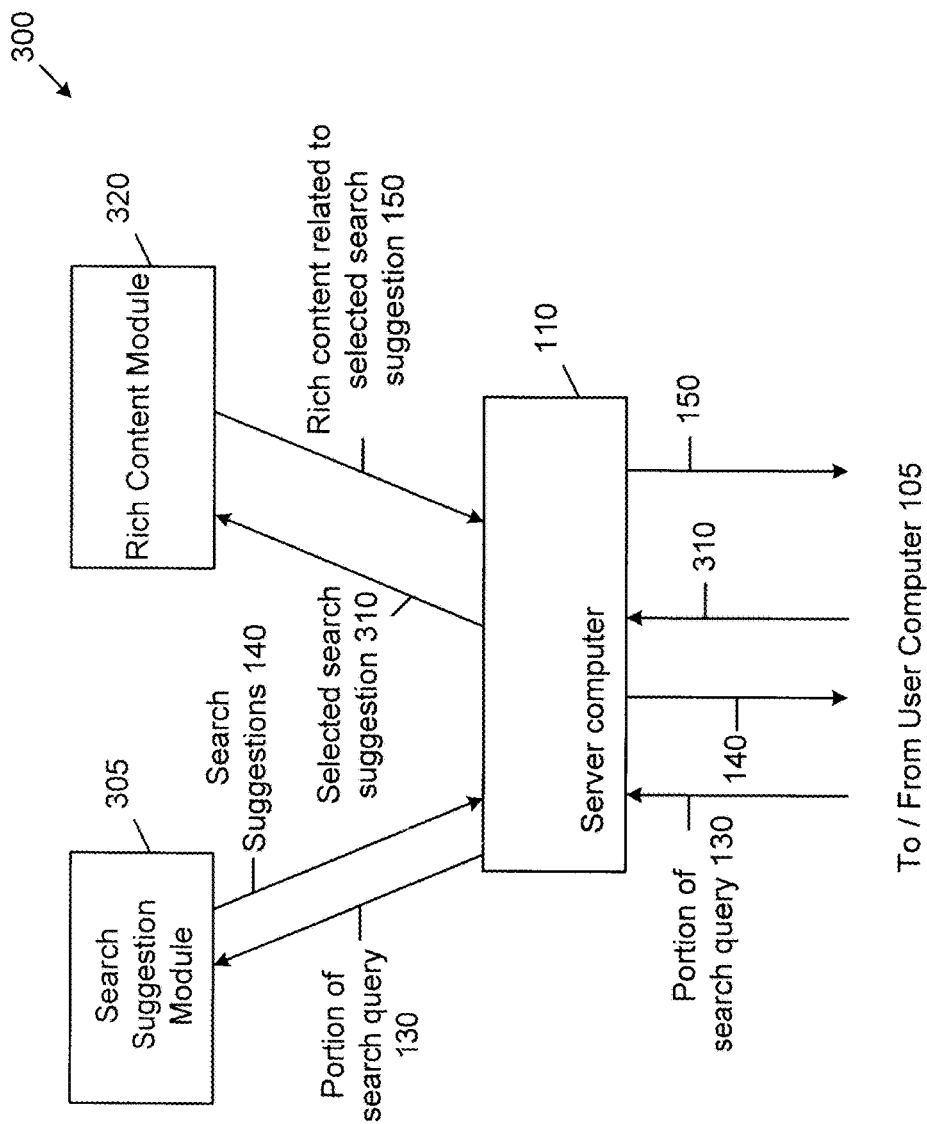
FIG. 3 is a block diagram of modules communicating with the server computer of FIG. 1A in accordance with an embodiment of the present disclosure.

FIG. 2 shows a flowchart illustrating an embodiment of the steps performed by the server computer 110. FIG. 3 is a block diagram of an embodiment of modules communicating with the server computer 110. As stated above, the server computer 110 receives, from the user computer, a portion of a search query 130 (step 205). In one embodiment, the user's geographic information can be used and is passed to the server computer 110. In one embodiment, the server computer 110 transmits the portion of the search query 130 to a search suggestion module 305. The search suggestion module 305 determines search suggestions 140 that are related to the portion of the search query 130 and/or the location of the user, and/or the intent of the user determined by personal preferences saved in the user's search history or interests. In one embodiment, the search suggestion module 305 determines the related search suggestions 140 based on the user's previous search history. For example, if a user has searched for sports-related subject matter within a predetermined time period (e.g., within the last two days), and the portion of the search query 130 is "ko", the search suggestion module 305 determines, in one embodiment, that the search suggestions 140 should relate to "Kobe Bryant" and not "kobe beef". Alternatively, if the user has searched for restaurants within a predetermined time period (e.g., within the last two days), and the portion of the search query 130 is "ko", the search suggestion module 305 determines, in one embodiment, that the search suggestions 140 should relate to "kobe beef". This personalization can occur over any period of time, can occur for one or more users, and can be an option that the user activates.

In another embodiment, the search suggestion module 305 determines the search suggestions 140 based on a popularity criteria of a search suggestion over a period of time. For example, if "Kobe Bryant" is searched for by ten million users over a period of a week, and "kobe beef" is searched for by two million users over the same period, in one embodiment the search suggestion module 305 displays Kobe Bryant as a first search suggestion or various search suggestions related to Kobe Bryant. The search suggestion of "kobe beef" may not be displayed as a search suggestion or may be displayed after a plurality of search suggestions for "Kobe Bryant" (e.g., Kobe Bryant—nba, Kobe Bryant—best dunks, Kobe Bryant—shoes, etc.).

The search suggestion module 305 transmits the determined search suggestions 140 to the server computer 110. The server computer 110 receives the search suggestions 140 (step 210) and transmits the search suggestions 140 to the user computer before the search query is searched (step 215) (e.g., before the user clicks on the Search button or types in his or her complete search query and hits Enter). In one embodiment, a search suggestion from the plurality of search suggestions 140 is selected. In one embodiment, this selection of a search suggestion occurs when the user hovers over the search suggestion with the user's cursor. In another embodiment, the selected search suggestion is a search suggestion that the user selects (clicks with the user's mouse). In yet another embodiment, the selected search suggestion is the first (or a predetermined number) search suggestion in the plurality of transmitted search suggestions 140. Although described herein as a single search suggestion being selected, in another embodiment a plurality of search suggestions 140 are selected (e.g., selecting the first three search suggestions 140).

The server computer 110 then transmits the selected search suggestion 310 to a rich content module 320 (step 220). As stated above, in one embodiment, the rich content module 320 determines rich content associated with the search suggestion 310. For example, the rich content can include a photograph of Kobe Bryant when the search suggestion 310 is "Kobe Bryant". The rich content module 320 transmits the rich content 150 to the server computer 110. The server computer 110 receives the rich content 150 (step 225). The server computer 110 then transmits the rich content 150 to the user computer 105 for display before the search query is searched (step 230). In one embodiment, the rich content 150 is displayed by the user computer 105 almost simultaneously with the display of the search suggestions 140.

Although shown in FIG. 3 as different modules, it should be noted that one or more of the functions of the modules shown in FIG. 3 may be external to the server computer 110, internal to the server computer 110, combined into a single module, etc.

Figure 4:
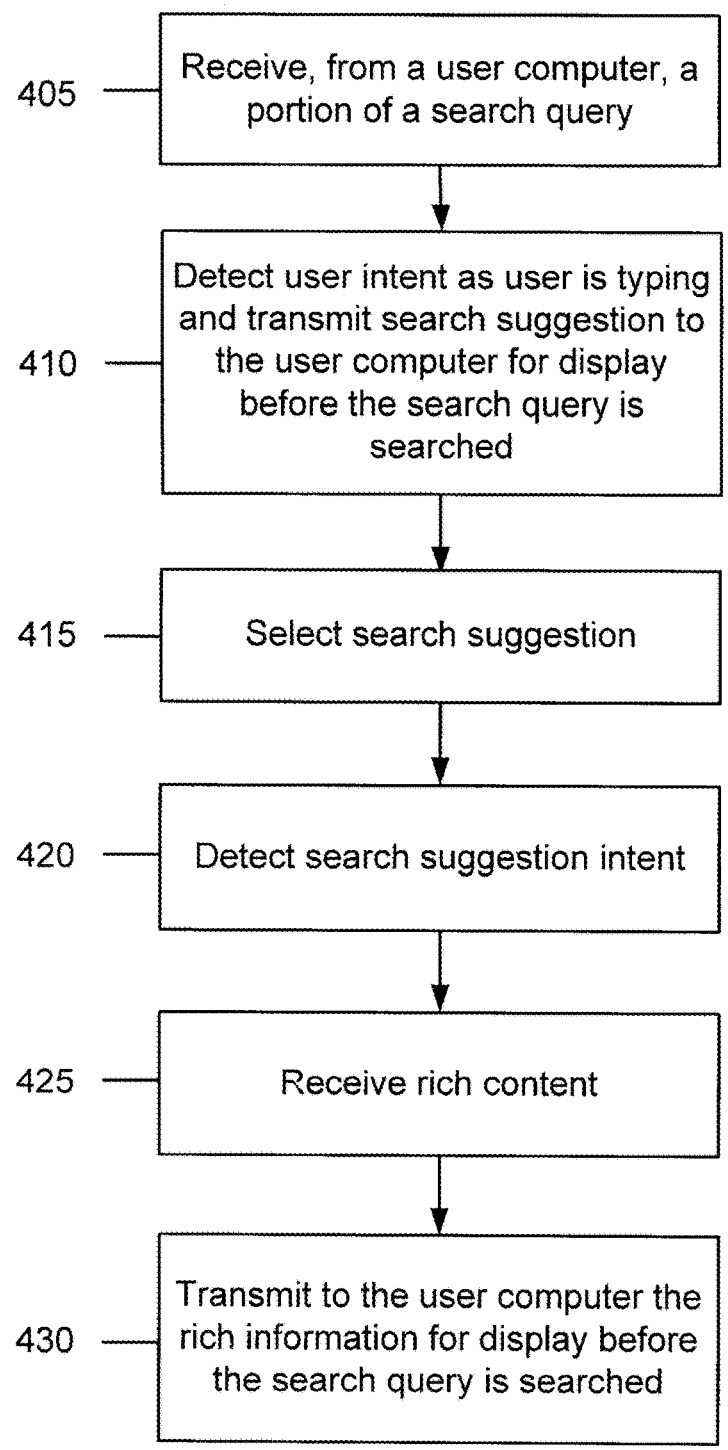
FIG. 4 is a flowchart illustrating steps performed by the server computer of FIG. 1A in accordance with an embodiment of the present disclosure.

FIG. 4 shows a flowchart of an embodiment of steps performed by the server computer 110. As stated above, server computer 110 receives, from a user computer, a portion of a search query (step 405). In one embodiment, the server computer 110 attempts to detect user intent from the portion of the search query as the user is typing and transmits one or more search suggestions to the user computer for display in the search suggestion region 145 before the search query is searched (step 410). A search suggestion is selected (e.g., automatically or based on user input) (step 415). The server computer 110 then attempts to detect search suggestion intent from the selected search suggestion (step 420). The server computer 110 receives rich content 150 from the rich content module 320 (step 425) and transmits the rich content to the user computer for display in the search suggestion region 145 (step 430).

Figure 5:
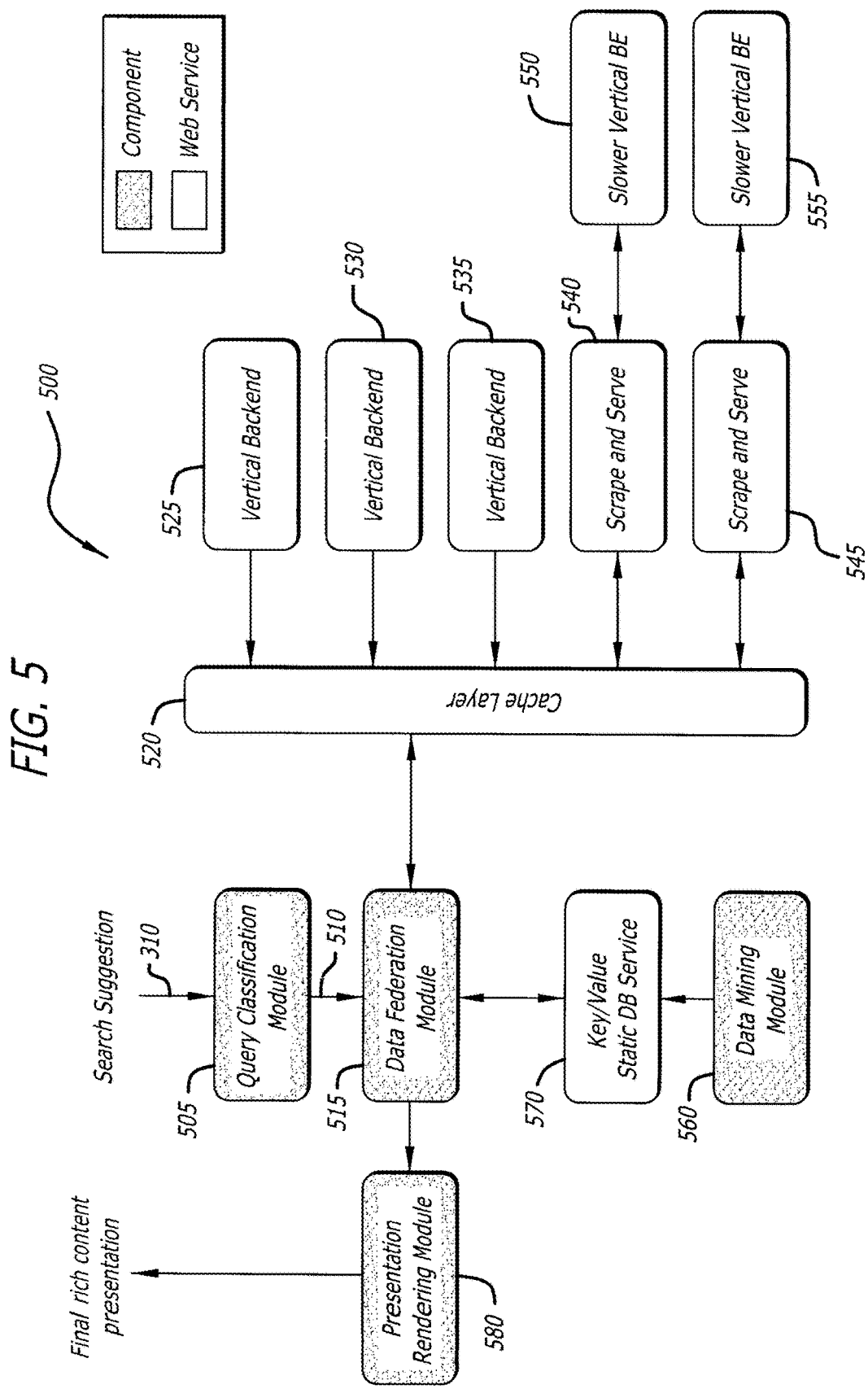
FIG. 5 is a block diagram of a system to implement the steps described in FIG. 2 and FIG. 4 in accordance with an embodiment of the present disclosure.

FIG. 5 is a block diagram of an embodiment of a system 500 to implement the above described functionality. Each component of the system 500 may be web services or components. In one embodiment, the search suggestion 310 and the portion of the search query are transmitted to a query classification module 505. In one embodiment, the query classification module 505 classifies the search suggestion 310 into categories, such as "Movie", "Music Artist", "Sports Player", "Weather forecast" or "Travel Destination". Some search suggestions 310 can be classified into a single category, while others may belong to multiple categories (e.g., the query "Chicago" is both a movie name and a city name).

Based on the suggestion category (or categories), different data sources are needed to fetch the raw data associated with this suggestion/category combination 510. For example, for "Chicago/movie", movie data, such as year, rating, director, casting, etc. are needed, but for "Chicago/city", the city's points of interest, current events, and weather report are needed. The suggestion/category combination 510 is transmitted to a data federation module 515. The data federation module 515 determines the importance of multiple data sources and fetches the data from corresponding sources. In one embodiment, the data from all of the categories cannot all be used. In one embodiment, one category is selected. In one embodiment, the data federation module 515 can select a single category using a fixed priority order, a query classification confidence level, the user's search session context, and/or the user's search history profile to determine what would be more interesting to the user. For example, if "Movie" is determined to be more important by the data federation module 515, then, based on a fixed priority order technique, the movie details of "Chicago" would be chosen. However, if the data federation module 515 is using the user's search history profile, and the user's search history profile reveals that he or she is a traveler, the city details of "Chicago" is chosen. The data federation module 515 is in communication with a cache layer 520 which communicates with any number of vertical backends (shown in FIG. 5 as vertical backend 525, 530, 535) and scrape and serve services 540, 545 connected to additional (e.g., slower) vertical backends 550, 555. In one embodiment, one or more of the vertical backends 525, 530, 535, 550, 555 contain weather, are third party backends, etc.

If there are vertical databases available associated with the vertical search engines, rich content of the search suggestion can be obtained by using the vertical search engines or web services. Search engines like Yahoo®, Bing® or Google® all have their own vertical search engines and databases. In another embodiment, the rich content can also be manually input into one or more databases. If no vertical database is available, editorial input can be used. The rich content can also be fetched/scraped from the web directly. For example, movie data can be fetched from the Internet Movie Database (IMDb) website automatically.

In one embodiment, to ensure low latency, the vertical web services (e.g., vertical backend 525, 530, 535, scrape and serve services 540, 545, etc.) are located behind cache layer 520. The query and responses from the vertical web services 525, 530, 535 are cached in this layer 520 for a predetermined period of time before they expire. The cache layer 520 is typically faster than the vertical web services 525, 530, 535, 540, 545, 550, 555, since the cache layer 520 does not include complex logic, such as an index lookup and ranking, etc. If a query is popular enough so that its data are made available in the cache 520, the overall latency of the system 500 is reduced.

In one embodiment, some vertical web services are not fast enough to be used directly. For example, some vertical web services need to use sophisticated methods to rank their search results, which take too much time for the system 500 to use. For these, in one embodiment a predefined list of queries that can trigger rich content of the corresponding category can be used, and then the vertical web services can be scraped with these queries in an offline fashion. In one embodiment, the scraped content is then served with a key/value lookup server. The predefined list of queries is regularly updated, and the scraping also takes place on a regular basis to ensure freshness. In one embodiment, the list of queries comes from one or more of the following methods: mine the search engine query logs by putting the queries in the logs through the query classification module 505, editorially generated, or a combination of both.

For queries that cannot be mapped properly to a certain category, in one embodiment the system 500 supplies content that gives the user some idea about the search results or suggests other queries that the user might be interested in. Such queries are usually longer queries, for which the query classification methods usually yield lower confidence scores. In order to provide such content for these kinds of queries, the system 500 can mine the search engine's query logs (via data mining module 560) and generate query/query relationship or query/search result relationship in many ways. This analysis can take place on a cloud computing platform, which is capable of processing large amounts of data, such as the query logs. After the mining, in one embodiment data is organized in a key/value pair fashion, where the key is the query itself and the value is the rich content to provide for the query. This database can be served with a key/value lookup service 570, whose latency is low. In one embodiment, the mining is repeated on a regular basis to reflect up-to-date query relationships. Such relationships can shift drastically over time, since users' interests change and are driven by popular events. The mining can also take place in near real-time by making use of real-time social network feeds and other data sources in order to provide popular and trending events as rich content to the user.

In one embodiment, after the federation module 515 finishes fetching data from the web services, and determines which data is to be used, the data federation module 515 sends the data to the presentation rendering module 580, which transmits the rich content to the user's browser for viewing in the search suggestion region 145.

In one embodiment, the rich content can be based on templates. In one embodiment, each category can have its own template, and the server computer 110 can fill in the template with the rich content obtained from the data federation module 515. In another embodiment, the template can be dynamically changing, to allow more relevant and dynamic presentation layout for better user engagement.

Figure 6:
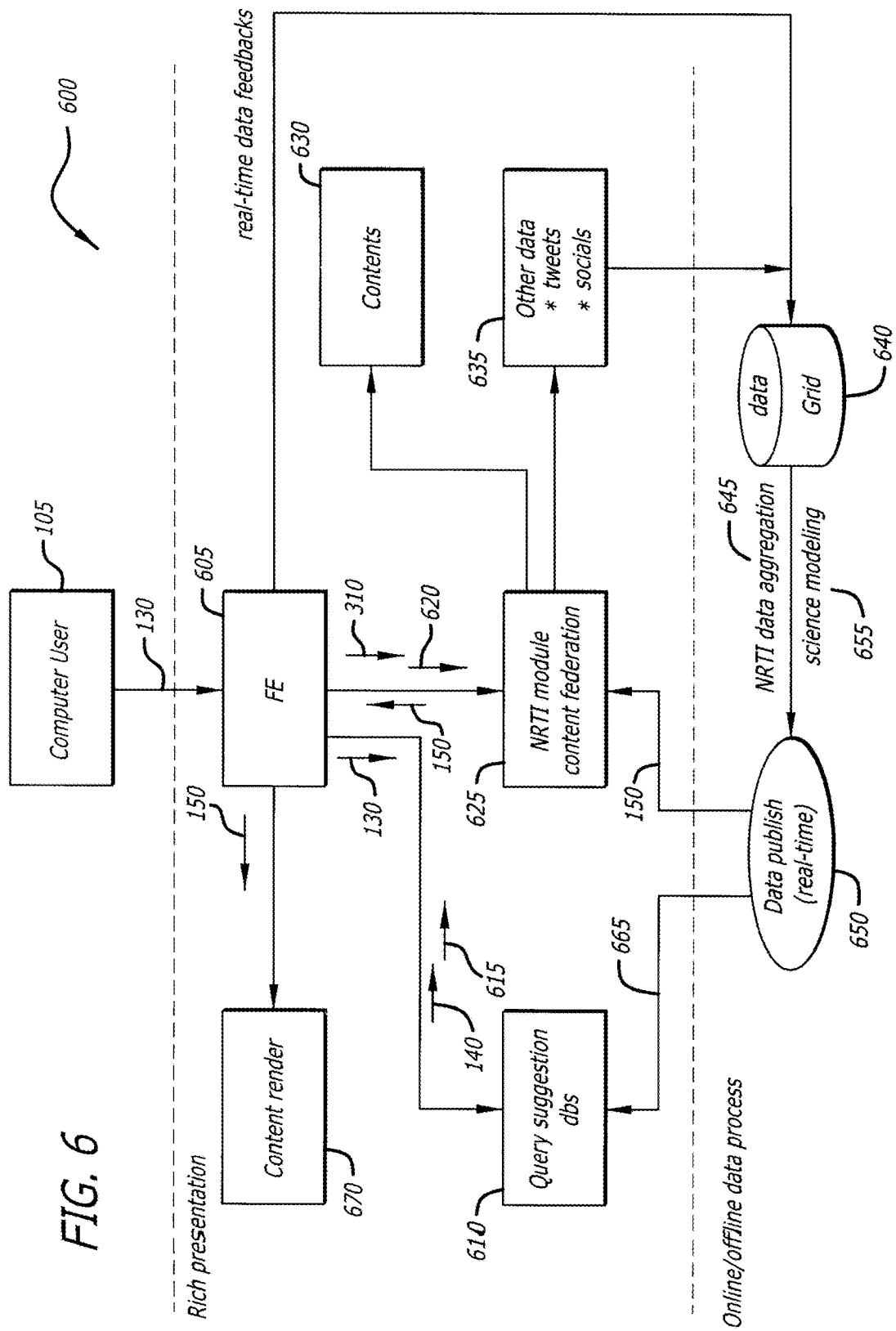
FIG. 6 is a block diagram of a system to implement the steps described in FIG. 2 and FIG. 4 in accordance with an embodiment of the present disclosure.

FIG. 6 is a block diagram of an embodiment of a system 600 to implement the above described functionality. As described above, an end user types in a portion of a search query 130 and the user computer 105 transmits this portion 130 to a front end (FE) 605 of the server computer 110. In one embodiment, the FE 605 transmits the portion of the search query 130 to query suggestion databases 610. In one embodiment, the query suggestion databases 610 return to the FE 605 search suggestions 140 related to the portion of the query 130 and metadata 615 associated with the search suggestions 140. The metadata 615 may include, as described above, the category or categories associated with each search suggestion, the frequency of search suggestions, click information and time, geographic metadata of the suggestion (e.g., Pizza Hut Florham Park has a city name), geographic distribution, etc. The FE 605 transmits one or more selected search suggestion 310 of the search suggestions 140 and the metadata 620 associated with the one or more selected search suggestion 310 to a near real-time query intelligence (NRTI) module 625. The NRTI module 625 performs content federation (e.g., obtains content from different data sources, such as from a Contents datasource 630 and/or an Other data source 635 containing, for example, tweets, social data, advertisements, user history, etc. In one embodiment, the data from these datasources 630, 635 are transmitted into a database 640 (e.g., on a grid) or a cloud system in an offline data process. In one embodiment, the data stored in this database 640 (e.g., on a grid) or cloud system is aggregated (arrow 645) and published as rich content 150 to the NRTI module 625 in an offline and/or online data publish process 650. In one embodiment, query/suggestion feedback 665 is transmitted to the query suggestion databases 610 in the offline and/or online data publish process 650. In one embodiment, science modeling (arrow 655) is also performed on the data stored in the database 640. Science modeling can include query classification, frequency analysis, trending detection, user interest analysis or detection, geographic aggregation, etc. In one embodiment, the FE 605 receives the rich content 150 and transmits the rich content 150 to a content renderer 670 to render the rich content 150 in the search suggestion region 145 on the user computer 105.

Figure 7:
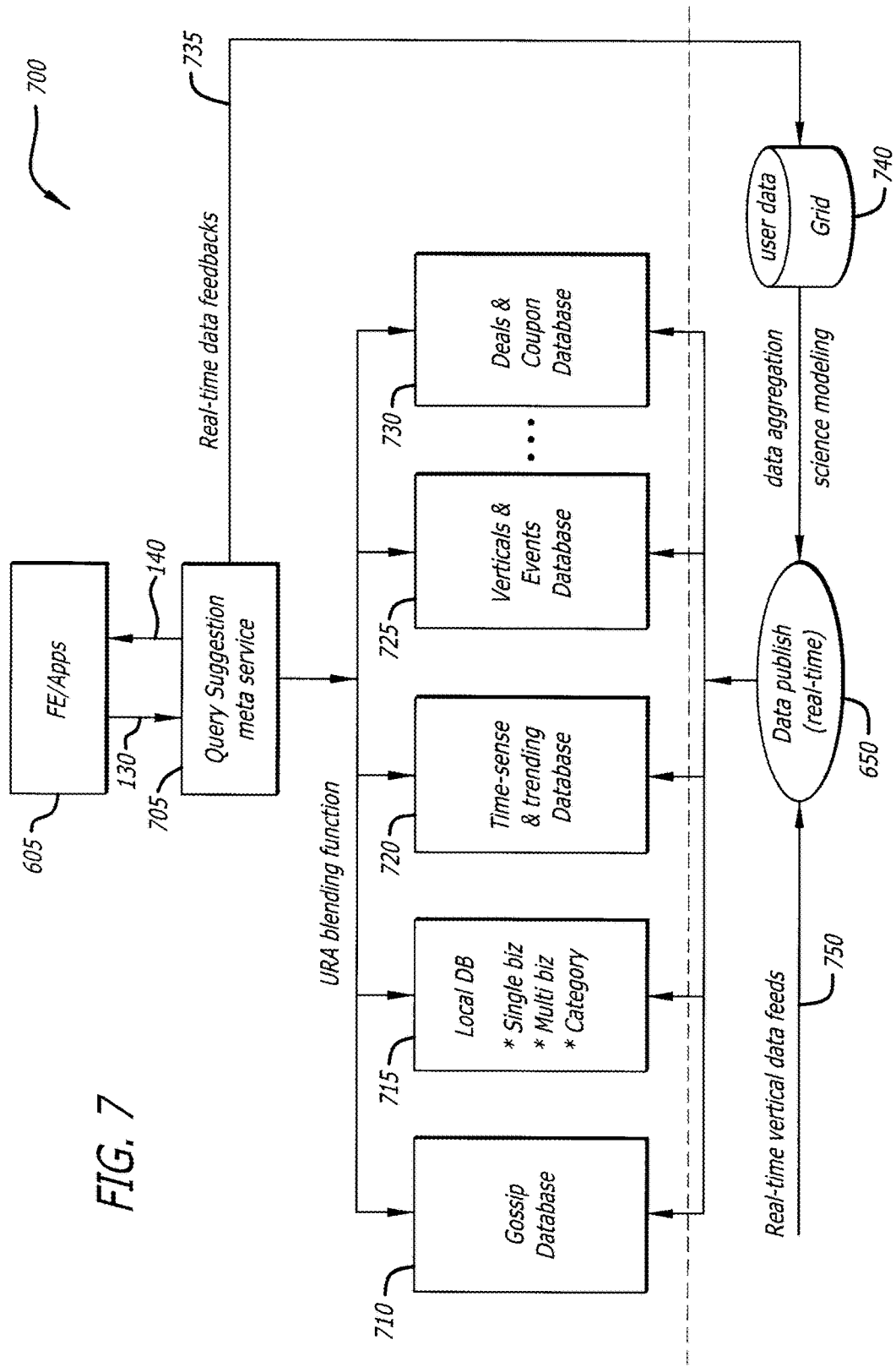
FIG. 7 is a block diagram of a system used to determine search suggestions in accordance with an embodiment of the present disclosure.

FIG. 7 is a block diagram of an embodiment of a system 700 used to determine search suggestions. In one embodiment, the FE 605 transmits the portion of the search query 130 to a query suggestion meta service 705. In one embodiment, the query suggestion meta service 705 communicates with multiple data sources to determine search suggestions 140, such as a gossip database 710 containing data on, for example, celebrities, a local database 715 containing data on, for example, businesses and categories, a time-sense and trending database 720 containing data on, for example, trending topics (i.e., topics that people are currently searching for), a verticals and events database 725 containing data on, for example, events, and a deals and coupon database 730 containing data on, for example, coupons or deals. In one embodiment, if no portion of a search query 130 is received, the search suggestions 140 (and rich content) provided by the server computer 105 may be or relate to trending topics from the time-sense and trending database 720.

In one embodiment, the query suggestion meta service 705 transmits data feedback 735 to a user database 740, and the user database 740 transmits aggregated data and results of science modeling (e.g., the user interest analysis and detection (e.g., 30 days ago, 7 days ago, right now, etc.), geographic interest, user group interest (e.g., age, gender, etc.), and trending detection, etc.) to data publish process 650. The data publish process 650 publishes this data to the databases 710, 715, 720, 725, 730. In one embodiment, the data publish process 650 publishes this data in near real-time. In one embodiment, the data publish process 650 also receives real-time (or near real-time) vertical data feeds 750.

Figure 8:
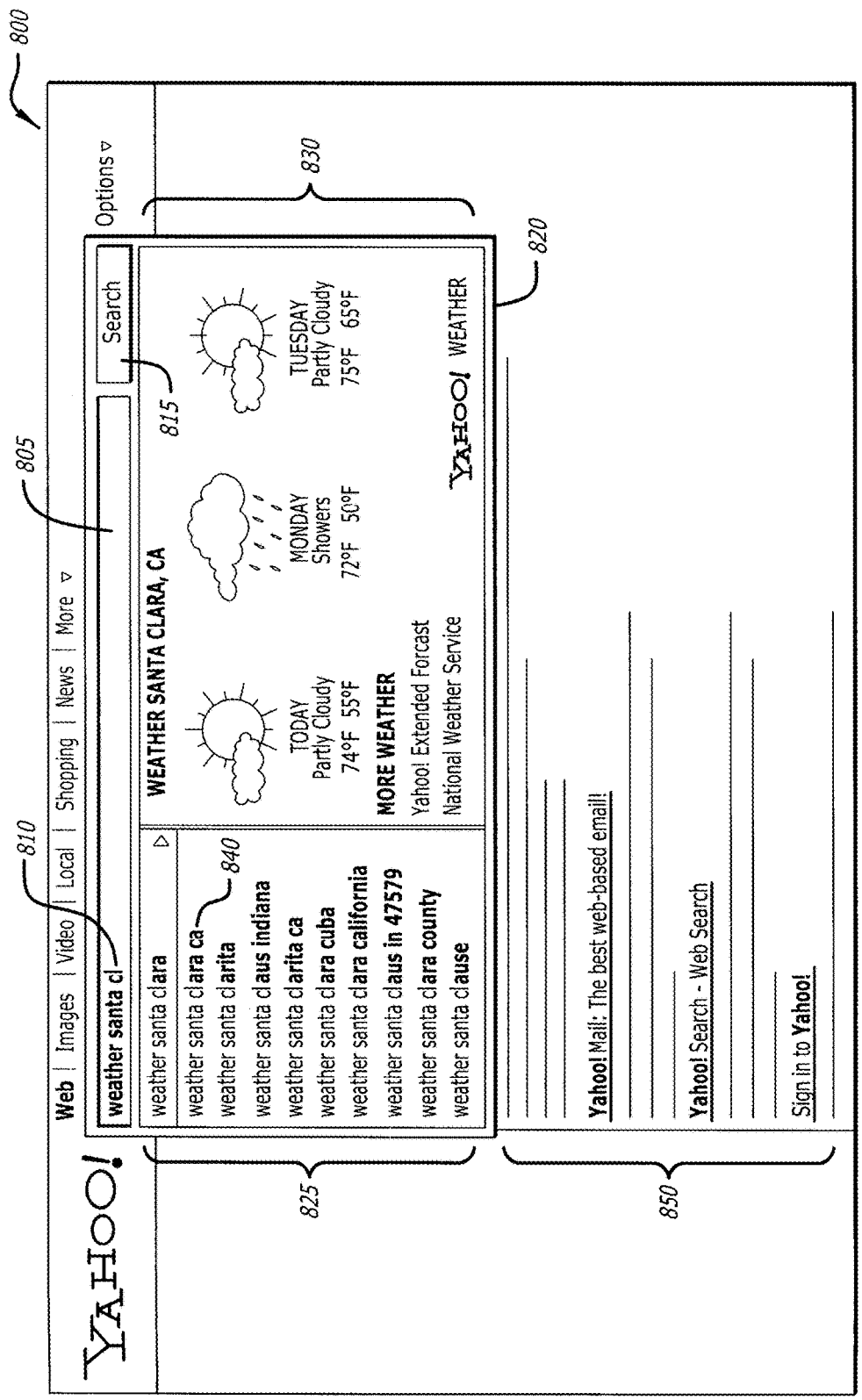
FIG. 8 is a screen shot of a web page having rich content in accordance with an embodiment of the present disclosure.
Figure 9A:
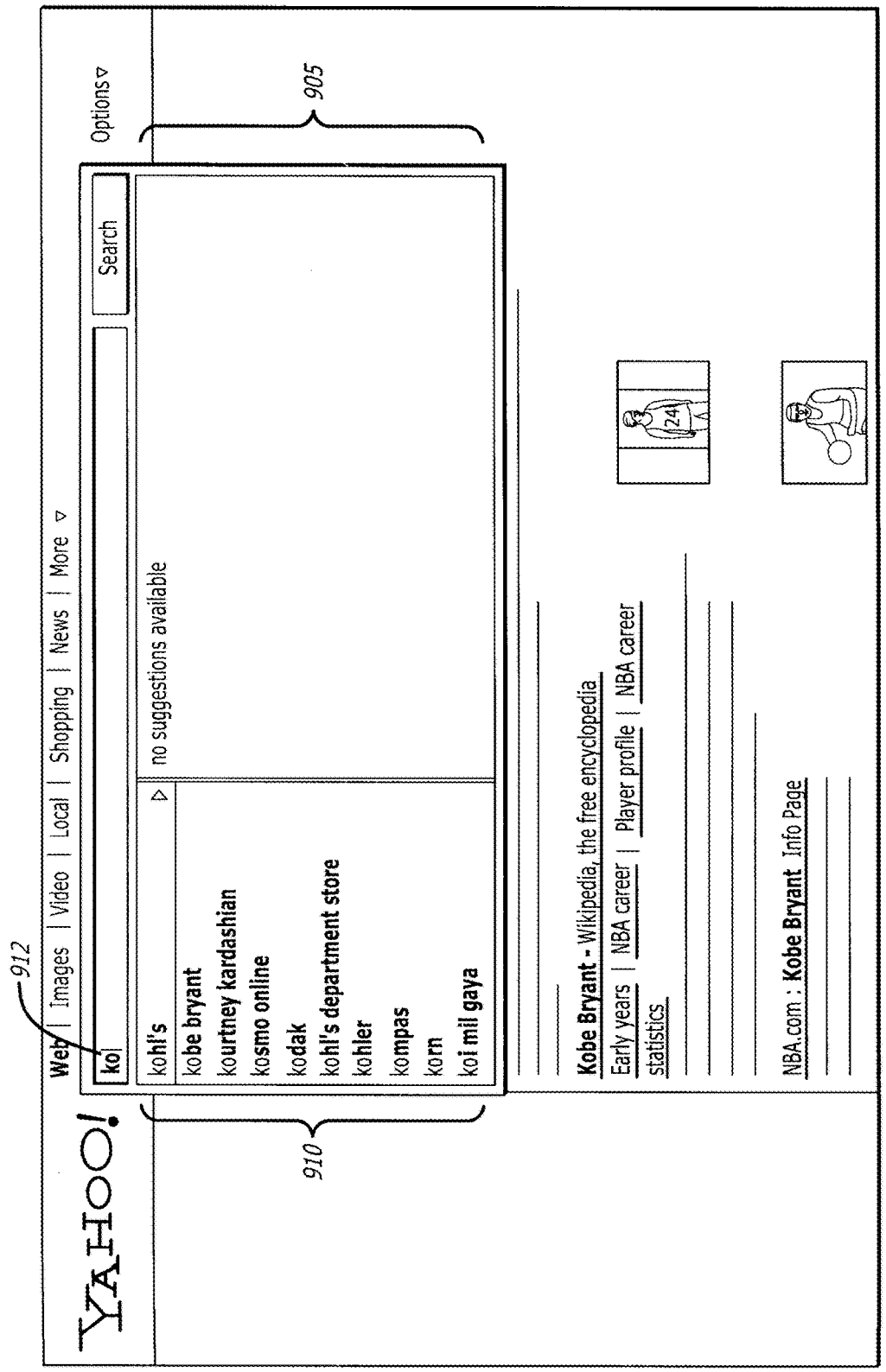

FIG. 8 shows an embodiment of a screen shot of a web page 800. The web page 800 includes a search query entry area 805 enabling a user to type in a search query. In one embodiment, the user types in a portion of a search query 810 and, before the user hits Enter or clicks on search button 815, a search suggestion region 820 is displayed with search suggestions 825 on one side of the search suggestion region 820 and rich content 830 on the other side of the search suggestion region 820. In one embodiment, first search suggestion 840 is selected (e.g., automatically or via user action). The rich content 830 displayed in the search suggestion region is related to the selected first search suggestion 840, as it shows the weather over the next few days in Santa Clara, Calif. Further, as described above, the search suggestion region 820 overlaps the search results area 850, which displays search results from a search. In another embodiment, the search suggestion region 820 is located above, next to, or below the search results area 850. In one embodiment, the search suggestions 825 on one side of the search suggestion region 820 expands to the right in order to display longer search suggestions.

Figure 10:
FIG. 10 is a screen shot of a web page having rich content in accordance with an embodiment of the present disclosure.

FIGS. 9A-9F show an embodiment of a screen shot having rich content 905 displayed next to search suggestions 910 in response to receiving a sequence of search queries. The final search query is "kobe bryant" but FIGS. 9A-9F illustrate how the search suggestions 910 and rich content 905 update as the search query 912 changes. In FIGS. 9B-9F, the rich content 905 includes a picture of Kobe Bryant, his position, and his season averages. In one embodiment, the rich content 905 can also include data from another service provided by the server computer 110, such as a fantasy rank 915 as shown. The rich content 830, 905 shown in FIGS. 8 and 9B-9F include text and graphics. Referring to FIG. 10, in another embodiment rich content 1005 includes only text, such as movie theaters near a particular city and movie times for those movie theaters.

Figure 11:
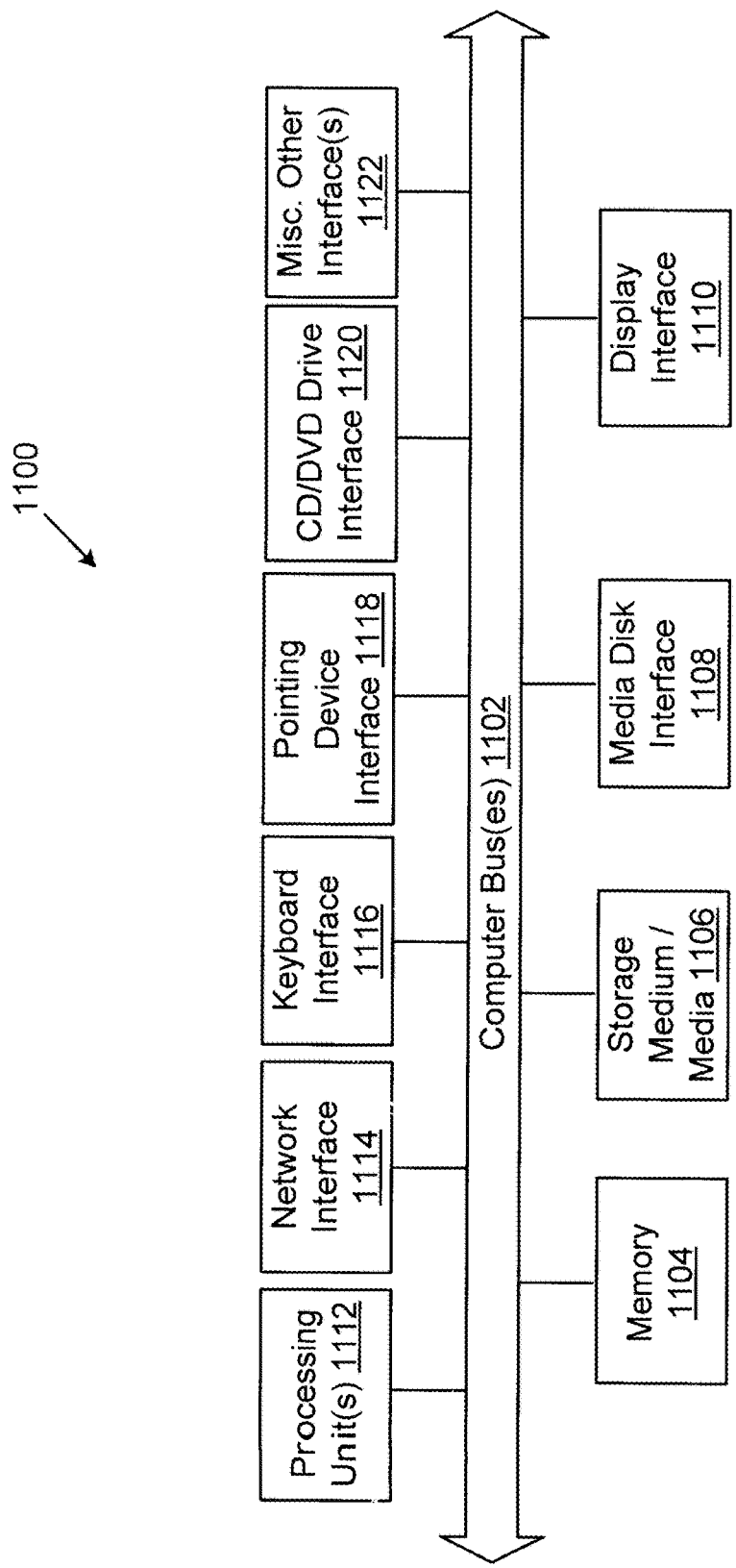
FIG. 11 is a block diagram illustrating an internal architecture of a computing device in accordance with an embodiment of the present disclosure.

FIG. 11 is a block diagram illustrating an internal architecture of an example of a computing device, such as server computer 110 and/or user computer 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 11, internal architecture 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, playlists and other files. Persistent storage medium/media 1106 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a computing device over a network from a user computer, alphanumeric characters forming a portion of a search query submitted by a user in a search query entry area;
receiving, by the computing device from a search suggestion module, a plurality of search suggestions related to the portion of the search query;
transmitting, by the computing device to the user computer, the plurality of search suggestions for display by the user computer in a first portion of a search suggestion region before the search query is initiated via user input, the search suggestion region displayed differently than a search results area;
receiving, from the user computer by the computing device, a selection of a search suggestion in the plurality of search suggestions, the receiving of the selection of the search suggestion comprising receiving an indication that the user hovers over the search suggestion with an input device of the user computer;
transmitting, by the computing device, the selected search suggestion to a rich content module;
receiving, by the computing device from the rich content module, rich content related to the transmitted search suggestion, the rich content scraped from the network and comprising a video and one or more content items selected from the group consisting of text, graphics, web links, icons, pictures, audio tracks, and answers to a question, the scraping of the network for the rich content further comprising performing the scraping while the computing device is not in communication with the user computer, the video positioned next to the search suggestion and comprising a video element playable by the user in response to detecting the user clicking the video; and
transmitting, by the computing device to the user computer, the rich content for display by the user computer in a second portion of the search suggestion region before the search query is initiated via user input, the second portion of the search suggestion region being separate from the first portion of the search suggestion region.

2. The method of claim 1, wherein the rich content is information that is presented next to the plurality of search suggestions.

3. The method of claim 1, wherein the rich content comprises tabbed web pages.

4. The method of claim 1, wherein one or more of the plurality of search suggestions are sponsored by a third party.

5. The method of claim 4, further comprising receiving payment from the third party to display a particular search suggestion associated with the third party at a particular position in the plurality of search suggestions displayed in the first portion of the search suggestion region.

6. The method of claim 1, wherein the plurality of search suggestions are further related to a location of the user.

7. The method of claim 1, wherein the plurality of search suggestions are further related to a previous search history of the user.

8. The method of claim 1, further comprising classifying a search suggestion in the plurality of search suggestions into one or more categories.

9. The method of claim 1, wherein the rich content is obtained from a social network.

10. A computer system comprising:
a hardware processor;
a storage medium for tangibly storing thereon program logic for execution by the processor, the program logic comprising:
character receiving logic executed by the processor for receiving, over a network from a user computer, alphanumeric characters forming a portion of a search query submitted by a user in a search query entry area;
search suggestion receiving logic executed by the processor for receiving, from a search suggestion module, a plurality of search suggestions related to the portion of the search query;
search suggestion transmitting logic executed by the processor for transmitting, to the user computer, the plurality of search suggestions for display by the user computer in a first portion of a search suggestion region before the search query is initiated via user input, the search suggestion region displayed differently than a search results area;
search suggestion selection receiving logic executed by the processor for receiving, from the user computer, a selection of a search suggestion in the plurality of search suggestions, the receiving of the selection of the search suggestion comprising receiving an indication that the user hovers over the search suggestion with an input device of the user computer;
selected search suggestion transmitting logic executed by the processor for transmitting the selected search suggestion to a rich content module;
rich content receiving logic executed by the processor for receiving, from the rich content module, rich content related to the transmitted search suggestion, the rich content scraped from the network and comprising a video and one or more content items selected from the group consisting of text, graphics, web links, icons, pictures, audio tracks, and answers to a question, the scraping of the network for the rich content further comprising performing the scraping while the computing device is not in communication with the user computer, the video positioned next to the search suggestion and comprising a video element playable by the user in response to detecting the user clicking the video; and
rich content transmitting logic executed by the processor for transmitting, to the user computer, the rich content for display by the user computer in a second portion of the search suggestion region before the search query is initiated via user input, the second portion of the search suggestion region being separate from the first portion of the search suggestion region.

11. The computer system of claim 10, wherein the rich content is information that is presented next to the plurality of search suggestions.

12. The computer system of claim 10, wherein the rich content comprises tabbed web pages.

13. The computer system of claim 10, wherein one or more of the plurality of search suggestions are sponsored by a third party.

14. The computer system of claim 13, further comprising payment receiving logic executed by the processor for receiving payment from the third party to display a particular search suggestion associated with the third party at a particular position in the plurality of search suggestions displayed in the first portion of the search suggestion region.

15. The computer system of claim 10, wherein the plurality of search suggestions are further related to a location of the user.

16. The computer system of claim 10, wherein the plurality of search suggestions are further related to a previous search history of the user.

17. The computer system of claim 10, further comprising classifying a search suggestion in the plurality of search suggestions into one or more categories.

18. A non-transitory computer readable storage medium tangibly storing computer program instructions capable of being executed by a processor of a computer system, the computer program instructions defining the steps of:
receiving, by a computing device over a network from a user computer, alphanumeric characters forming a portion of a search query submitted by a user in a search query entry area;
receiving, by the computing device from a search suggestion module, a plurality of search suggestions related to the portion of the search query;
transmitting, by the computing device to the user computer, the plurality of search suggestions for display by the user computer in a first portion of a search suggestion region before the search query is initiated via user input, the search suggestion region displayed differently than a search results area;
receiving, from the user computer by the computing device, a selection of a search suggestion in the plurality of search suggestions, the receiving of the selection of the search suggestion comprising receiving an indication that the user hovers over the search suggestion with an input device of the user computer;
transmitting, by the computing device, the selected search suggestion to a rich content module;
receiving, by the computing device from the rich content module, rich content related to the transmitted search suggestion, the rich content scraped from the network and comprising a video and one or more content items selected from the group consisting of text, graphics, web links, icons, pictures, audio tracks, and answers to a question, the scraping of the network for the rich content further comprising performing the scraping while the computing device is not in communication with the user computer, the video positioned next to the search suggestion and comprising a video element playable by the user in response to detecting the user clicking the video; and transmitting, by the computing device to the user computer, the rich content for display by the user computer in a second portion of the search suggestion region before the search query is initiated via user input, the second portion of the search suggestion region being separate from the first portion of the search suggestion region.

\* \* \* \* \*